Sept. 13, 1960 D. E. GRISWOLD 2,952,273
VARIABLE INTERVAL TIME-CONTROLLED VALVE
Filed Oct. 11, 1954 4 Sheets-Sheet 1

INVENTOR.
DAVID E. GRISWOLD
BY Bacon Thomas
ATTORNEYS

Sept. 13, 1960  D. E. GRISWOLD  2,952,273
VARIABLE INTERVAL TIME-CONTROLLED VALVE
Filed Oct. 11, 1954  4 Sheets-Sheet 2

INVENTOR.
DAVID E. GRISWOLD
BY
Bacon + Thomas
ATTORNEYS

Sept. 13, 1960  D. E. GRISWOLD  2,952,273
VARIABLE INTERVAL TIME-CONTROLLED VALVE
Filed Oct. 11, 1954  4 Sheets-Sheet 3

INVENTOR.
DAVID E. GRISWOLD
BY Bacon & Thomas
ATTORNEYS

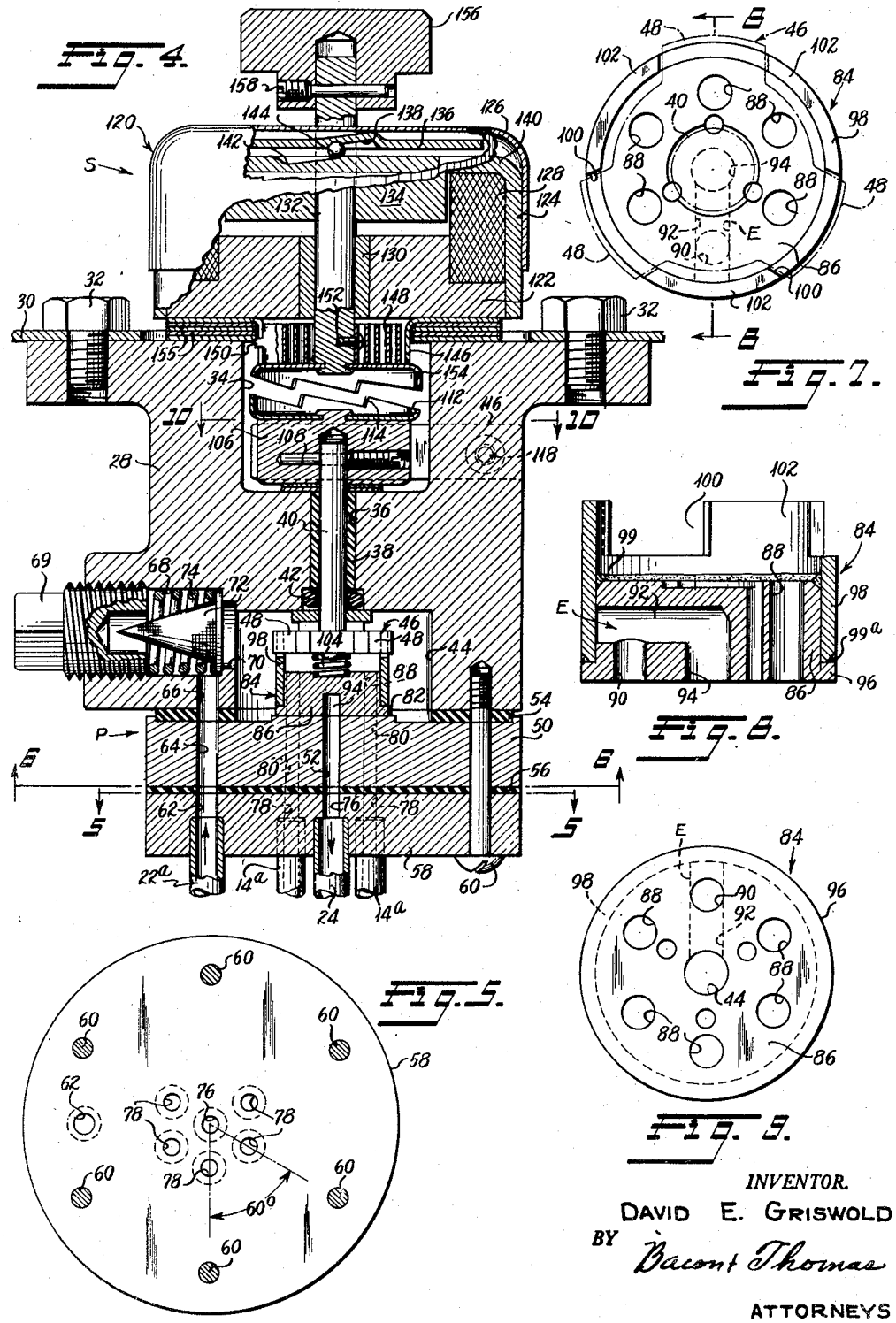

United States Patent Office 2,952,273
Patented Sept. 13, 1960

2,952,273
VARIABLE INTERVAL TIME-CONTROLLED VALVE

David E. Griswold, San Marino, Calif., assignor to Donald G. Griswold, Alhambra, Calif.

Filed Oct. 11, 1954, Ser. No. 461,608

5 Claims. (Cl. 137—624.16)

This invention relates to a system of fluid distribution and time-controlled valve means therefor, and particularly to automatic sprinkler systems for controlling sprinklers to operate at preselected times for intervals of desired duration.

Automatic sprinkling systems for lawns and the like generally include sprinkler heads distributed throughout the lawn area and in many instances the lawn area to be watered is of such extent that the usual water supply pipes are unable to provide sufficient pressure and volume of flow to operate all the sprinklers simultaneously. It is customary, therefore, to arrange the sprinklers in groups, each group arranged to water a selected area and each group being supplied by a single branch or distribution conduit. The separate branches or distribution conduits are connected to the main supply line and controlled by pressure-actuated diaphragm valves that may be selectively operated to supply water to any one of the branches or distribution conduits.

The present invention relates to time-controlled means for preselecting the times at which each distribution conduit will be supplied with water and to predetermine the length of time each distribution conduit is in operation and to thereafter shut the valve controlling that conduit and open the valve controlling another conduit. More specifically, water distribution through any given conduit may be timed for intervals of 2½ minutes to one hour, for any time of the day and any day of the week. Cycles may be repeated with only a 2½-minute interval between cycles or cycles may be varied when repeated.

The present invention provides an automatic sprinkler control system including a pilot valve for controlling the operation of the valves connecting the distribution conduits to the main supply line. The pilot valve of the present invention effects distribution and control of operating fluid for each of the distribution conduit valves and is subject to a time-control mechanism arranged to energize a rotary solenoid at predetermined intervals and times to change the position of the disc of the pilot valve to effect actuation of the pressure-actuated valves to provide watering of different areas in the desired sequence. The employment of a rotary solenoid to actuate the pilot valve disc is advantageous in that it insures rapid and positive action of said disc and eliminates the necessity for a continuously operating drive motor therefor. The control system of the present invention also includes means for limiting the time interval during which electrical energy is supplied to the solenoid to thereby prevent overheating and possible damage to the solenoid and/or other electrical components of the system.

It is therefore the principal object of this invention to provide a fluid distribution apparatus and automatic control system therefor which will effect flow through a number of conduits in predetermined sequence and for adjustable time intervals.

Another object of this invention is to provide an electrical circuit for controlling the operation of the pilot valve of a pilot valve controlled fluid distribution system in such manner as to cause the pilot valve to be fast-acting and to effect such action by a relatively inexpensive actuating element.

It is another object of this invention to provide such a control circuit characterized by the safety feature of preventing overheating of at least the electrical component which actuates the pilot valve.

Still another object of the invention resides in the provision of a fully automatic time-control system for fluid distribution apparatus that is subject to a manual over-control, whereby the sequence of operations may be manually controlled, if desired.

A more specific object of the invention is to provide an automatic lawn sprinkling system that can be set to water the lawn daily at a given time and to water any given area of said lawn for a predetermined, fixed time interval.

Another object of the invention is to provide an automatic pilot valve controlled sprinkler system which will indicate the position of the disc of the pilot valve and the corresponding part of the cycle of operation then taking place.

Still another object of the invention is to provide a pre-assembled sprinkler control unit adapted for outdoor installation and in which all of the elements controlling the valves in the distribution conduits are enclosed in a weather and tamper-proof housing.

Still further objects and advantages will become apparent to those skilled in the art as the description proceeds with reference to the accompanying drawings, wherein:

Fig. 4 is an enlarged vertical sectional view through the pilot valve and rotary solenoid combination of the present invention;

Fig. 5 is a sectional view taken on line 5—5 of Fig. 4;

Fig. 6 is a sectional view taken on line 6—6 of Fig. 4;

Fig. 7 is a plan view of the pilot disc assembly;

Fig. 9 is a bottom view of the pilot disc assembly of Figs. 7 and 8;

Figure 1:
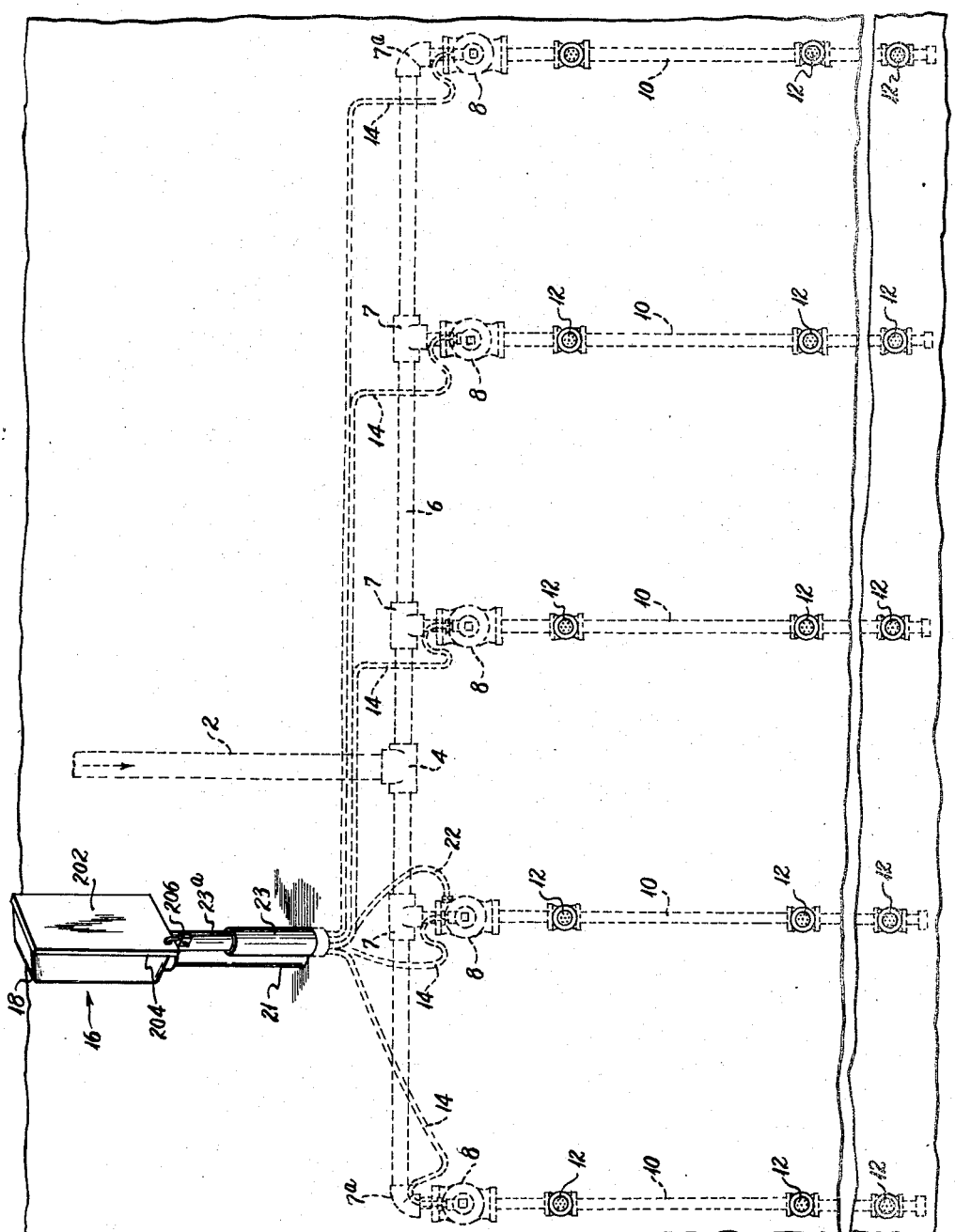
Fig. 1 is a diagrammatic view of an automatic sprinkler system embodying the control unit of the present invention.

Referring first to Fig. 1, the conduits or pipes and the tubes shown in dotted line are buried underground in the usual manner and comprise a main water supply pipe or conduit 2 connected through a T-fitting 4 to a header pipe 6. At intervals along header pipe 6 and through suitable T-fittings 7 and elbows 7ª, conventional pressure fluid operable diaphragm valves 8 are arranged to control flow of water to the distribution conduits or pipes 10. Each of the distribution conduits 10 is provided with a series of sprinkler heads 12 projecting upwardly to the surface of the ground in position to water the lawn area thereabout. The valves 8 are all of identical construction and may be of a known type wherein the valve closure element is actuated to closed position by means of pressure fluid supplied thereto through tubes 14, and actuated to open position by line pressure when the pressure in the associated tube 14 is relieved. The admission of fluid pressure to the tubes 14, and venting of such pressure is controlled by a pilot valve P (to be described later) in the control unit 16 to which all of the tubes 14 extend, as shown in Fig. 1.

Figure 3:
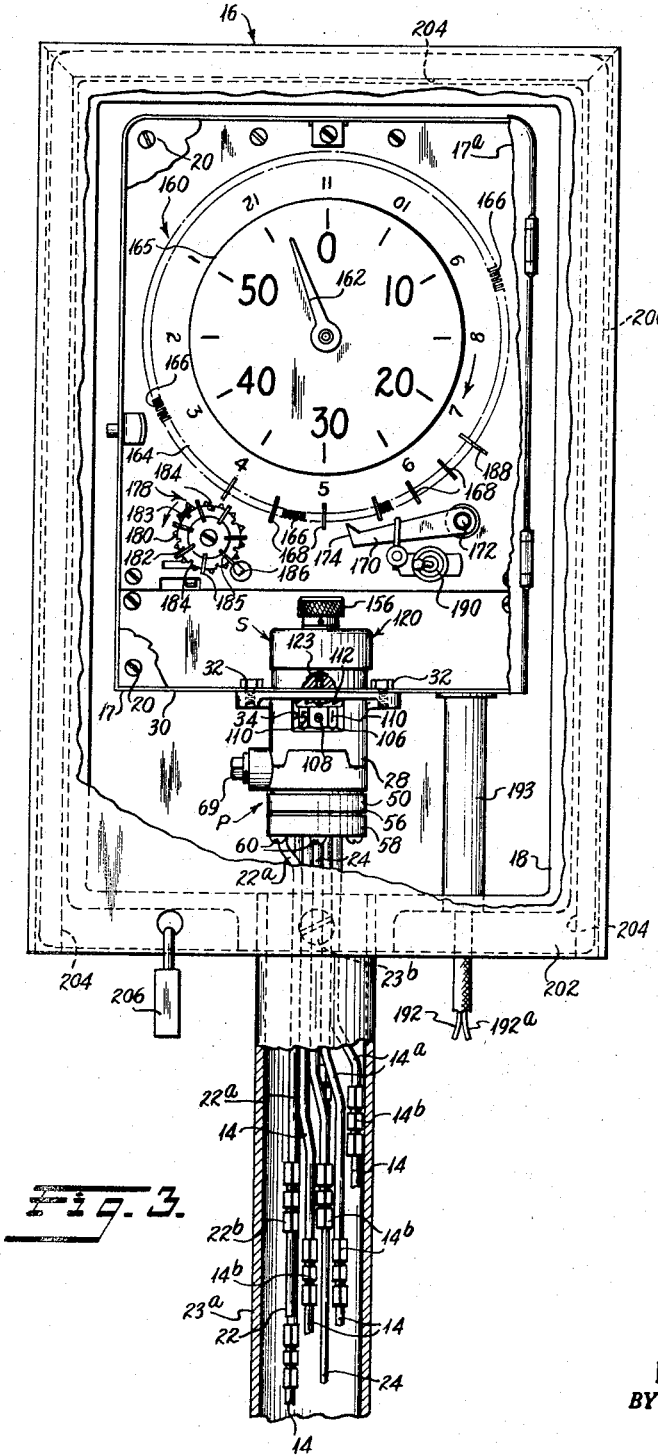
Fig. 3 is an enlarged front elevational view of the sprinkler control unit, a portion of the housing cover and the door of the timer box being broken away to reveal the enclosed parts.

The control unit 16 includes a box 17, Fig. 3, having a hinged cover 17ª. For outdoor installations, the box 17 is disposed within a weather-proof housing 18, and is secured to the rear wall of said housing by screws 20 extending through its bottom wall. The housing 18 is mounted upon the upper end of a standard 21, Fig. 2, the lower end of which is embedded underground in a mass of concrete 21ª. A section of pipe 23 is welded to the standard 21 below the housing 18 with its lower end below ground level. The tubes 14 extend upwardly from beneath the surface of the ground through the pipe section 23 and terminate above said pipe section in a telescoping pipe 23ª, the upper end of which is secured to the housing 18 by a screw 23ᵇ, Fig. 3, and are connected to the pilot valve P in a manner explained later.

Figure 2:
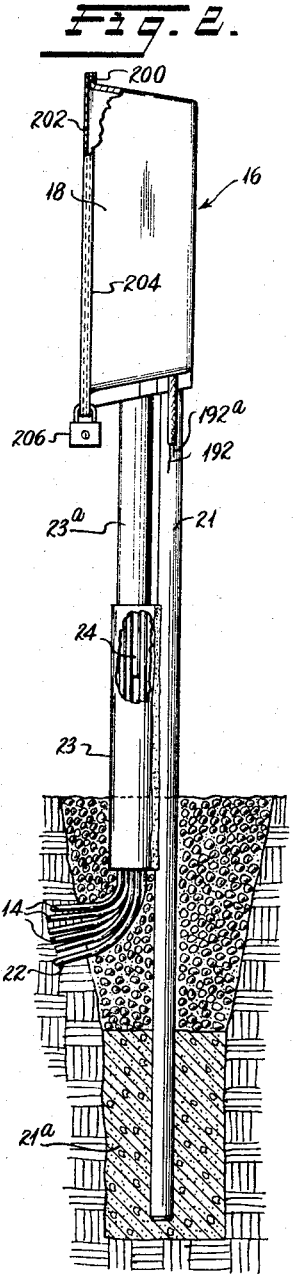
Fig. 2 is a side elevation of the control unit shown in Fig. 1.

Operating fluid under pressure is supplied to the pilot valve P through a conduit or tube 22, which may be connected at any desired point to supply pipe 2, or header 6, and is actually shown connected to the intake side of one of the pressure-actuated valves 8 located in a convenient position. Water under pressure is at all times admitted to the tube 22 and conducted thereby to the pilot valve P, as will also be explained later. When the pilot valve P is operated to relieve pressure in one of the tubes 14, a quantity of water must be displaced by the diaphragm in the corresponding valve 8 and its tube 14 exposed to atmospheric pressure. The pilot valve P sequentially vents the tubes 14 in a predetermined sequence by connecting these tubes to a vent or drain tube 24 (see Figs. 2 and 3), which terminates at any convenient location exposed to atmospheric pressure and from which water may be drained. As shown in Fig. 2, the drain tube 24 extends downwardly through the pipe 23ª to a position above the surface of the ground and from which vented water may drain into the soil.

The pilot valve P and the rotary solenoid S for actuating the same are shown in cross-section in Fig. 4. The pilot valve P comprises a body 28 secured to the lower wall 30 of the box 17 by cap screws 32. The body 28 is provided with a recess 34 in alignment with a bore 36 in which a bearing 38 is mounted. A shaft 40 is journalled in the bearing 38 and a suitable O-ring seal 42 surrounds shaft 40 in a counterbore adjacent the lower end of bearing 38. At its lower end, the shaft 40 projects into a pressure chamber 44 and is therein provided with a drive washer 46 having three radially projecting arms or fingers 48, as best shown in dot-and-dash lines in Fig. 7.

The chamber 44 (Fig. 4) is in the form of a recess in the lowermost end of body 28 and is closed by a fluid distributing member 50 provided with a central drain port 52 extending therethrough. The member 50 is sealed to the body 28 by a suitable gasket 54 and a further gasket 56 is provided between the member 50 and a base 58. The base 58 and member 50 are held in assembled relation to the body 28 by bolts 60. Short tubes 14ª and 22ª extend downwardly from and are soldered to the base 58 in communication with passages 78 and 62, respectively, extending therethrough, which passages are in alignment with corresponding ports 80 and 64, respectively, extending through fluid distribution member 50. The port 64, in turn, communicates with a passageway 66 in the body 28 opening into a chamber 68 therein closed by plug 69. The chamber 68 communicates with chamber 44 through an opening 70 covered by a conical filter screen 72 held in place by spring 74 and plug 69. The tube 22ª is accessible upon sliding the pipe 23ª downwardly into pipe section 23, and is connected to the tube 22 by conventional fittings 22ᵇ, as best shown in Fig. 3. It will be evident that water under pressure from main pipe 2 may flow through tubings 22 and 22ª into the chamber 68 and thence through filter 72 into chamber 44. The drain or vent tube 24 is also soldered to the base 58 and communicates with a passageway 76 in said base which, in turn, is aligned with the central port 52 extending through member 50. The tubes 14ª also terminate within pipe 23ª and are connected to the tubes 14 by conventional fittings 14ᵇ, as shown in Fig. 3. Thus, the short tube sections 14ª, 22ª and 24 are preferably mounted in the base 58 as a convenient sub-assembly so that the control unit 16 can be readily connected with the tubes 14 and 22 at the time of installation.

In the embodiment shown herein, there are five distribution conduits 10 and consequently five tubes 14 and five ports 80. The ports 80 extend through a raised, lapped planar surface or seat 82 (see Figs. 4 and 6) on the inner face of member 50 located centrally of the chamber 44. The drain port 52 in member 50 extends through the seat 82 centrally of the ports 80. The arrangement of the ports 80 and 52 is best shown in Fig. 6, and as shown therein the ports 80 are angularly spaced apart 60° about the port 52 and extend only ⅔ of the way around the circle upon which they are disposed. Thus, the ports 80 constitute stations equally spaced angularly about the central port 52, and the point indicated by letter "A" in Fig. 6 comprises an imperforate station spaced from the adjacent ports 80 a distance (120°) equal to twice the spacing between the ports 80 themselves.

The pilot valve P comprises a pilot disc assembly 84 (see Figs. 4, 7, 8 and 9) consisting of a disc or circular member 86 having a planar, lapped bottom surface to mate with the surface of seat 82. The disc 86 is provided with a series of pressure ports 88 extending therethrough and arranged in a circular formation corresponding exactly to the spacing and positioning of the ports 80 in member 50. A sixth, or generally U-shaped, exhaust port E includes an outer leg 90 which extends through the lower face of disc 86 into communication with a radial passageway 92 which, in turn, communicates with a central leg 94 registering with the central port 52 in member 50. The disc 86 is further provided with an integral collar 96 adjacent its lower end against which a tight-fitting tubular skirt 98 abuts. The skirt 98 is soldered at 99 and 99ª or otherwise securely fixed to the disc 86, surrounding the major portion thereof, closing the outer end of passageway 92 and extending upwardly above the upper surface of the disc 86. The upwardly projecting portion of the skirt 98 is notched at three equally spaced positions to provide recesses 100 and upwardly extending ears 102. The transverse dimension of the notches 100 is substantially equal to the circumferential dimension of the fingers or projections 48 on the drive member 46 as best shown in Fig. 7. The parts are so positioned that the fingers 48 of the driver 46 are received within the notches 100 and the driver is otherwise so dimensioned as to hold the disc 86 in substantially concentric relation to the seat 82. The fit between the driver 46 and the notches 100 and ears 102 is such that sufficient space exists between the driver and the adjacent portions of skirt 98 to permit water under pressure in chamber 44 to flow around the driver into the ports 88 in disc 86. A compression spring 104 bears at its upper end against the driver 46 and at its lower end against the disc 86 to hold the latter firmly against the seat 82. It will thus be seen that the shaft 40 may be rotated to correspondingly rotate disc 86, and the disc will at all times firmly abut its seat 82 even though the shaft 40 may not be exactly perpendicular to the surface 82.

It will be obvious that the pilot disc assembly 84 may be rotated by shaft 40 to position its exhaust port portion 90 in vertical alignment with station "A" of the member 50. In this position, none of the tubes 14 will be connected to the drain tube 24 but will all be in communication with the chamber 44 through the ports 88. Under these conditions, operating fluid under pressure is supplied to all of the tubes 14 and all valves 8 will thus be held in closed condition by the pressure from main pipe 2. The shaft 40 may be actuated to rotate the valve disc 86 through an angle of 60° or ⅙ of a revolution, at which time the exhaust port portion 90 of the pilot disc 84 will be placed in communication with one of the ports 80 and thus the tube 14 in communication with that port will be vented through port 90, passageway 92, recess 94 and drain tube 24 to the atmosphere. The particular valve 8 controlled by that tube 14 will then be allowed to open and water will be supplied to its corresponding distributor conduit 10 and the sprinklers 12 associated therewith. Clearly, the pilot disc 84 may thereafter be again rotated through an additional ⅙ revolution to again provide communication between the previously vented tube 14 and the chamber 44 to close the previously opened valve 8 and to vent the next tube 14 and open its corresponding valve 8. In this manner, the valves 8 may be sequentially permitted to open, whereby their corresponding sprinklers 12 will be effective to water a predetermined portion of the lawn. In the course of a complete rotation of the pilot disc 84, each of the distributor conduits 10 will be supplied with water in any desired sequential order, depending upon the order in which tubes 14 are connected to tubes 14ª, and thereafter all valves 8 will be closed when the exhaust port portion 90 of the pilot valve P again reaches position "A."

Figure 10:
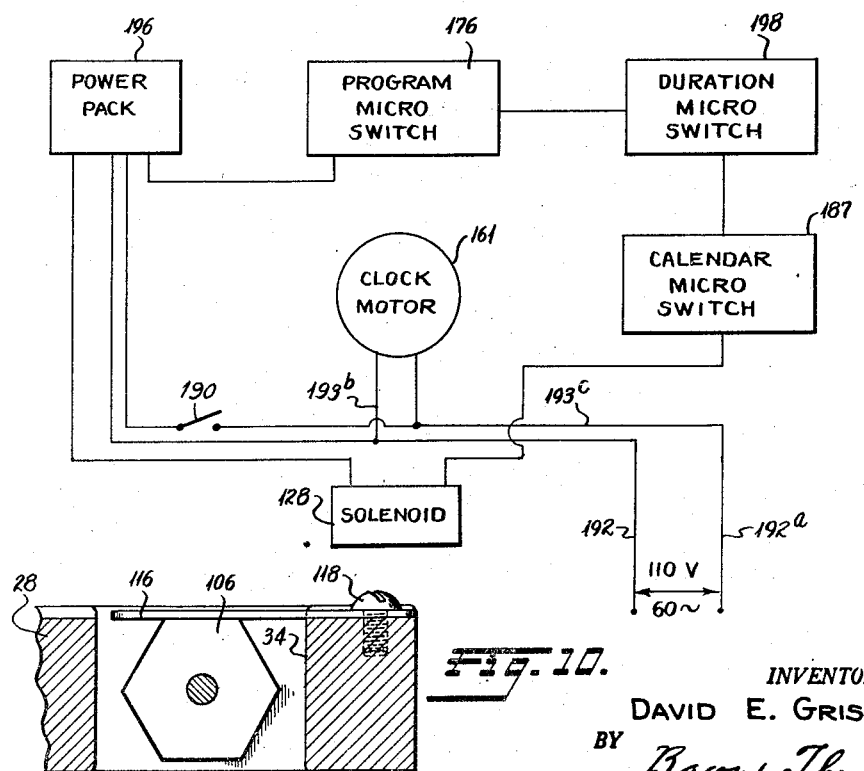
Fig. 10 is a fragmentary sectional view taken on the line 10—10 of Fig. 4, illustrating the leaf spring and co-operating hexagonal head which hold the pilot disc in properly indexed position.

The shaft 40 extends upwardly through bearing 38 into the recess 34, Fig. 4, in body 28. A head 106 is rigidly secured to the shaft 40 in recess 34 by a dog screw 108. The head 106 is of hexagonal shape (see also Figs. 3 and 10), having six peripheral faces thereon. There is one flat peripheral face corresponding to each of the pilot disc pressure ports 88 and a further face corresponding to the registration of exhaust port E with position "A." The recess 34 extends completely through the body 28, whereby the head 106 is visible from the front of the control unit 16, as is clearly evident from Fig. 3. That peripheral face of the head 106, clearly visible from the front of the apparatus when the port 90 is in position "A," is preferably the face through which the dog screw 108 is threaded and the screw and its opening constitute indicia indicating that the pilot disc 84 is in such position that all of the valves 8 are closed. Each of the other peripheral faces of the head 106 may be provided with suitable indicia 110 (see Fig. 3) to indicate which group of sprinklers 12 is in operation when that face appears in full view. Thus, numerals "1" and "5" appear upon the faces of the head 106 on either side of the face marked by screw 108 and may correspond to the extreme left and extreme right distribution pipes 10, respectively, of Fig. 1. The remaining faces bear indicia "2," "3" and "4" corresponding to the remaining distribution pipes. When any given numbered face is parallel with the front of the body 28, it indicates that the sprinklers 12 in the corresponding pipe 10 are in action.

A flat leaf spring 116 (see Fig. 10) is secured to the rear side of body 28 by a screw 118 or the like and extends across the open rear of recess 34 into engagement with a flat face of the head 106. In the form shown, the pilot disc 84 is rotatable to six different angular positions or stations and the leaf spring 116 bears against successive peripheral faces of head 106 to releasably hold said head, shaft 40 and pilot disc 84 indexed in any one of its six different positions.

A cup-shaped clutch element 112 (see Fig. 4) is secured to the head 106 and is provided with six upwardly extending peripheral clutch teeth 114 of such shape that the clutch element 112 can be driven only in one direction.

The means for sequentially rotating pilot disc 84 to its different angular positions comprises the rotary solenoid S, which includes a housing 120 having a massive paramagnetic bottom wall 122, a side wall structure 124 and a cover 126. The bottom wall 122 carries a pair of studs 123 (one of which is shown in Fig. 3) for mounting the solenoid S upon the body 28 of the pilot valve P. An annular solenoid coil 128 is arranged in the housing 120. The bottom wall 122 supports a bushing 130 in which an armature shaft 132 is mounted for both rotation and axial sliding. A paramagnetic armature hub 134 is fixed to the shaft 132 and is movable therewith both in rotation and in axial displacement downwardly from the position shown. A cam disc 136 is fixed to the shaft 132 above the side wall structure 124 and is provided with a plurality of circumferentially spaced cam grooves 138. The side wall structure 124 is provided with an inturned upper flange 140 overlying the coil 128 and the flange 140 is provided with upwardly facing cam grooves 142 corresponding in number to the cam grooves 138 in the cam plate 136. Balls 144 are supported by the cam grooves 142 and, in turn, support the cam disc 136 by engagement with the cam grooves 138 therein. The bottom wall 122 is provided with a downwardly extending annular housing structure 146 enclosing a spiral spring 148 fixed at its outer terminus, as at 150, to the annular housing 146 and secured at its inner end by a screw 152 to the lower end of shaft 132. A driving clutch element 154, complementary to the clutch element 112, is fixedly secured to the lower end of shaft 132. A plurality of shims 155 is disposed between the pilot valve housing 28 and the housing 146 to assure proper engagement of the clutch elements 112 and 154. The uppermost end of shaft 132 is provided with a hand knob 156 fixed thereon by a dog screw 158.

It will be evident that energization of the coil 128 by passing an electric current therethrough will establish a strong magnetic field through armature 134 and the armature will be urged downwardly by the magnetic forces created. The balls 144 engaging both the solenoid housing and the cam disc 136 prevent the armature 134 and shaft 132 from moving directly downwardly in response to the magnetic force but the axial force applied to the balls 144 and acting on the cam surfaces 138 and 142 causes the armature structure along with shaft 132 and cam plate 136 to rotate about the axis of shaft 132 through a substantial angle while moving downwardly a relatively short distance. The spring 148 is so arranged that downward movement of shaft 132 energizes the spring 148 and the armature 134 moves in rotation and axial displacement against the force of spring 148. Upon downward and rotational movement of the shaft 132, the clutch element 154 is brought into engagement with the clutch element 112 and acts to rotate the head 106, shaft 40 and pilot disc 84 through one rotational step of ⅙ of a revolution. The solenoid structure S is so designed that its normal range of operation includes sufficient angular rotation to rotate the pilot disc 84 the desired amount (60°). Upon de-energization of coil 128, spring 148 acts to return the armature 134 to the position shown and retract clutch element 154 from clutch element 112. The flat spring 116 then acts against the adjacent side of the head 106 to hold the pilot disc 84 in its new position. The hand knob 156 may be manually operated at will to set the disc 84 at any desired starting position by pressing downwardly thereon and turning the same, without the necessity of energizing coil 128. The indicia 110 on the peripheral faces of head 106 are readily observable to indicate the setting thus made.

The means for controlling energizing of coil 128 of rotary solenoid S comprises a time control clockwork mechanism indicated generally at 160 in Fig. 3. This mechanism includes a synchronous motor 161 (shown only diagrammatically in Fig. 11) operable by a suitable source of alternating current and connected to drive a clock hand 162 and a timing disc 164. The arrangement is such that the timing disc 164 is turned through one complete revolution every twelve hours; whereas, the indicating hand 162 is driven one complete revolution each hour and traverses a stationary dial 165 having indicia representing time in minutes. The entire periphery of the timing disc 164 is provided with radial notches 166 in which program clips 168 are positionable. The notches 166 are spaced apart a distance such that each represents a 2½-minute interval. Suitable numerical indicia are provided on the disc 164, as shown, to indicate the time of day represented by each of the notches 166.

The clips 168 may be removed from and repositioned on the disc 164 at will in any of the desired notches 166 representing the time of day at which it is desired to actuate the pilot disc 84.

A switch operating arm 170 is pivotally mounted for rotation about the axis of a pivot 172, and is biased to project its end 174 toward the periphery of timing disc 164. The clips 168 are so shaped that movement thereof by disc 164 past the end of arm 170 causes said arm to swing outwardly away from disc 164 sufficiently to close a program microswitch 176, shown only diagrammatically in Fig. 11.

The timing mechanism 160, Fig. 3, is further provided with a calendar switch controlling mechanism 178 comprising a star wheel 180 and a notched disc 182 driven thereby. The star wheel is yieldably held against rotation by a spring finger 183. The disc 182 is provided with fourteen peripheral notches 184, each representing the a.m. or p.m. 12-hour periods of each day of the week. Removable clips 185 are selectively positionable in the notches in disc 182 and project therefrom in position to operate a lever 186 to close a calendar microswitch 187, shown only diagrammatically in Fig. 11. A permanent clip 188 is fixedly secured on the timing disc 164 and is of such configuration that it does not actuate the arm 170 as it passes the same but does engage and actuate the star wheel 180 through 1/14 of a revolution, once for each revolution of the disc 164. Thus, the calendar disc 182 is rotated through one complete turn each week. A master toggle switch 190 controls the circuit of the timing mechanism 160.

Figures 8, 11:
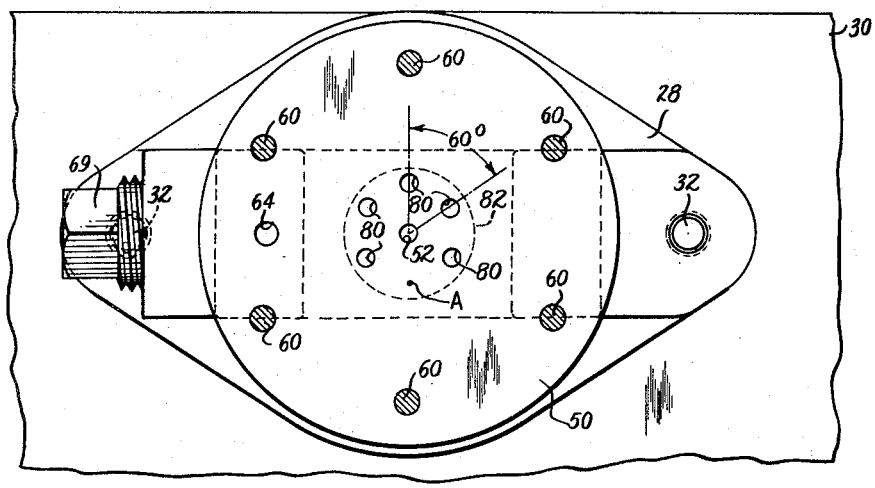
Fig. 8 is a sectional view, taken on the line 8—8 of Fig. 7.
Fig. 11 is a schematic view of the wiring diagram for the sprinkler control unit of the present invention.

Fig. 11 diagrammatically shows the wiring diagram for the time control mechanism. A source of alternating current is provided by supply line conductors 192 and 192ª. These conductors extend through a conduit 193 (Fig. 3) disposed in the housing 18 into the box 17. The clock motor 161, for driving the timing disc 164 and hand 162, is always in circuit across the conductors 192 and 192ª through leads 193ᵇ and 193ᶜ, so that the clock runs constantly. Operation of master switch 190 does not affect the clock motor 161, although it will be apparent that the motor 161 can be made subject to control by the switch 190 simply by connecting the lead 193ᶜ with the conductor 192ª at a point between the switch 190 and the calendar microswitch 187. As is clearly indicated, the timing circuit includes the calendar microswitch 187 (operated by calendar disc 182) and the program microswitch 176 (operated by arm 170) arranged in series with each other and connected in series with the solenoid S. Since the solenoid S is better operated by direct current, a conventional "power pack" 196 is provided to convert the alternating current of the supply line to direct current of the desired voltage for operation of the solenoid. A further switch 198 is connected in series in the circuit with the other units of the time control mechanism and comprises a time duration microswitch, which may be of any conventional or desired construction. The duration microswitch 198 is of such nature that it is normally closed to complete a circuit therethrough but will remain closed for only a predetermined period of time while current is passing therethrough to thus limit the time interval during which the circuit is completed. The clips 168 on timing disc 164 are necessarily of substantial thickness and since the disc 164 rotates through one revolution only once in twelve hours, it will be obvious that the arm 170 will be held outwardly in its switch-closing position for a substantial period of time, at each actuation thereof. The relatively high current supplied to solenoid coil 128, if supplied for several minutes, might cause excessive heating of the solenoid and possible damage to the electrical system. The duration microswitch 198 is, therefore, provided in the circuit to limit the period of current flow through coil 128 to just a few seconds. A single pulse of current through coil 128 of very limited duration is sufficient to actuate the solenoid to advance the disc 84 of pilot valve P through one step.

As is obvious from Fig. 11, the solenoid coil 128 is energized only when the program microswitch 176, the duration microswitch 198, calendar microswitch 187, and the master switch 190 are all closed.

In operation, each of six clips 168 is positioned wherever desired on the disc 164, and clips 185 may be positioned on the calendar disc 182 at those positions representing 12-hour periods during the week when no sprinkling or watering of the lawn is desired. When one of the clips 185 engages the calendar microswitch lever 186, that switch is opened and the solenoid coil 128 cannot be energized during that 12-hour period.

As timing disc 164 rotates, the clips 168 are successively brought into engagement with the end 174 of arm 170 to close the program microswitch 176 at that time. Assuming that the calendar microswitch 187 is closed at the same time, current will be supplied to the solenoid coil 128 to advance the control valve 84 one step and supply water to one of the distribution conduits 10. When the next clip passes arm 170 and again sends current through solenoid coil 128, the control valve 84 is advanced another step to shut off water from the distribution conduit previously opened and to open a succeeding conduit 10. Thus, the lawn or other area may be automatically watered completely by watering successive portions thereof under control of the mechanism of the present invention. The interval of watering will depend upon the spacing of the clips 168 on the disc 164, and as shown in Fig. 3, the watering intervals for each conduit 10 will be about 30 minutes.

The control unit 16 is rendered tamper-proof by providing a lip 200 extending outwardly around the margin of the open face of the housing 18, and a cover 202 having an inwardly extending flange 204 along its sides and top which is slipped down over the lip 200. The cover 202 and the lip 200 have registering openings at the lower edge thereof to receive a padlock 206 to prevent unauthorized removal of said cover.

While a single specific embodiment of the invention has been shown and described herein, it is to be understood that such description is merely illustrative whereas the invention may take other forms within the scope of the appended claims.

I claim:

1. In a control system: a rotary pilot valve; a rotary solenoid in driving relation with said pilot valve, said solenoid including an armature that rotates through a predetermined angle and advances axially at each energization thereof, and means for returning said armature to a starting position when said solenoid is de-energized; a driving member on said armature; a driven member connected with said pilot valve, said driving and driven members being axially separated when said solenoid is de-energized and so related that energization of said solenoid causes said driving member to advance axially into engagement with said driven member and rotate the same through a predetermined angle; and means for energizing said solenoid comprising, a control circuit having said solenoid connected therein and having a program switch connected in said circuit in series with said solenoid for energizing the same at selected intervals during a unit of time, a calendar switch connected in said circuit in series with said program switch and solenoid for holding said circuit open during preselected units of time, and timing means for actuating said program switch and said calendar switch at said preselected times.

2. In a control system as defined in claim 1 including a duration control switch connected in said circuit in series with said solenoid, program switch and calendar switch for limiting the length of time said solenoid is energized while said program and calendar switches are closed.

3. In a control system as defined in claim 1 including a manually operable master switch connected in said circuit in series with the solenoid and series-connected switches, and an electric motor for driving said timing means, said motor being connected in parallel with said control circuit, whereby said motor is continuously energized irrespective of the condition of said master switch.

4. In a system as defined in claim 1 in which the timing means includes a clock motor having a rotatable element carrying adjustable clip means, said program switch being actuatable by said clip means to control energization of the solenoid.

5. A system as defined in claim 4 in which a duration switch is connected in the circuit in series with the solenoid, said duration switch being normally closed and automatically opening after a given time interval upon completion of the circuit to said solenoid, whereby to limit the period of energization of said solenoid.

References Cited in the file of this patent

UNITED STATES PATENTS

| | | |
|---|---|---|
| 1,315,054 | Teisseire | Sept. 2, 1919 |
| 1,420,258 | Hammond | June 20, 1922 |
| 1,606,245 | Lang | Nov. 9, 1926 |
| 1,708,276 | Marks | Apr. 9, 1929 |
| 1,765,377 | Marks | June 24, 1930 |
| 1,791,927 | Geiger | Feb. 10, 1931 |
| 1,961,386 | Payne | June 5, 1934 |
| 2,204,532 | Ergbuth et al. | June 11, 1940 |
| 2,341,041 | Hauser | Feb. 8, 1944 |
| 2,360,321 | Griswold | Oct. 17, 1944 |
| 2,421,481 | Collins | June 3, 1947 |
| 2,442,835 | Allen | June 8, 1948 |
| 2,449,178 | Sansbury | Sept. 14, 1948 |
| 2,478,702 | Moody | Aug. 9, 1949 |
| 2,488,110 | Aitken | Nov. 15, 1949 |
| 2,495,462 | Lassiter | Jan. 24, 1950 |
| 2,498,189 | Wattson | Feb. 21, 1950 |
| 2,596,330 | Everard | May 13, 1952 |
| 2,611,392 | Johnson | Sept. 23, 1952 |
| 2,666,450 | Berry | Jan. 19, 1954 |
| 2,674,490 | Richards | Apr. 6, 1954 |
| 2,738,807 | Addison | Mar. 20, 1956 |
| 2,851,099 | Snoddy | Sept. 9, 1958 |